(No Model.)  2 Sheets—Sheet 1.

G. D. SPIELMAN.
SNAP HOOK.

No. 311,791.  Patented Feb. 3, 1885.

Attest:
T. A. Bruhl.
John W. Grace

Inventor:
George D. Spielman
By George J. Murray
Atty (No Model.) 2 Sheets—Sheet 2.

G. D. SPIELMAN.
SNAP HOOK.

No. 311,791. Patented Feb. 3, 1885.

Attest:
T. A. Bruhl
John W. Grace

Inventor:
George D. Spielman
By George J. Murray
Atty

UNITED STATES PATENT OFFICE.

GEORGE D. SPIELMAN, OF CINCINNATI, OHIO.

SNAP-HOOK.

SPECIFICATION forming part of Letters Patent No. 311,791, dated February 3, 1885.

Application filed July 11, 1883. (No model.)

*To all whom it may concern:*

Be it known that I, GEORGE D. SPIELMAN, a citizen of the United States, residing at Cincinnati, in the county of Hamilton, State of Ohio, have invented certain new and useful Improvements in Snap-Hooks, of which the following is a specification.

This invention relates to an improvement in snap-hooks and the mode of producing the same cheaply. Its object is a snap-hook that can be cheaply produced, will have a neat, compact appearance, and will be self-locking.

The invention consists in certain details of construction and combination of parts, all of which will be first fully described in connection with the accompanying drawings, after which the novel features of my invention will be particularly pointed out in the claims.

Figure 1:
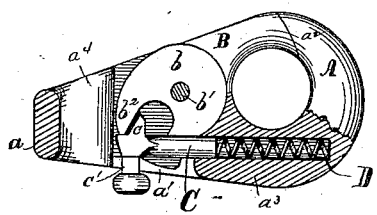
Figure 2:
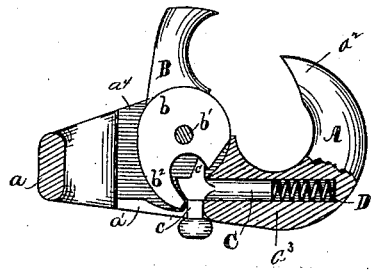
Figure 3:
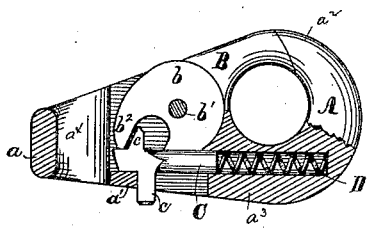
Figure 4:
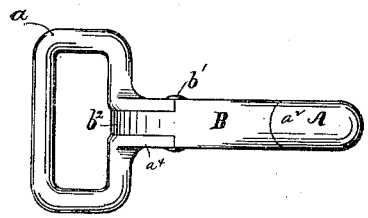
Figure 5:
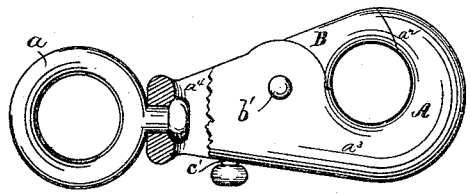
Figure 6:
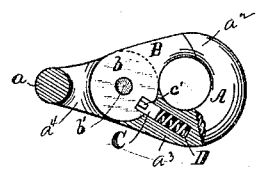
Figure 7:
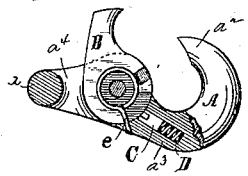
Figure 8:
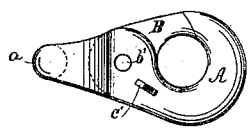
Figure 9:
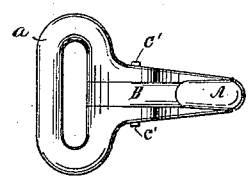
Figure 10:
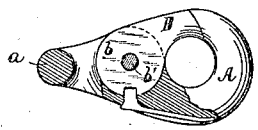
Figure 11:
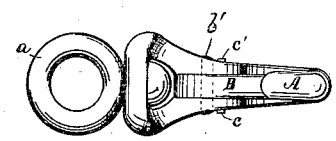
Figure 12:
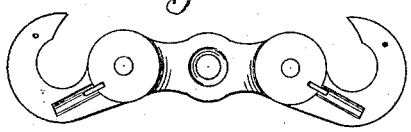
Figure 14:
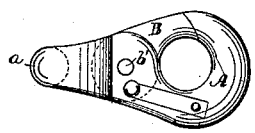

In the accompanying drawings, in which similar reference-letters indicate like parts wherever they occur in the various views, Figures 1 and 3 are side views of my preferred form of snap-hook, partly in elevation and partly in section. In these views the jaw or latch is shown closed. The portion of the hook shown broken away exposes the follower and spring by which the latch is opened and automatically closed and locked. Fig. 2 is a view similar to Fig. 1, showing the position of parts when the latch is opened. Fig. 4 is a front elevation of the hook shown in Figs. 1 and 3. Fig. 5 is a side elevation of a hook with a swivel-ring attached. Fig. 6 is a side view, partly in section, of a modified form of my invention in which the latch is not opened by the retraction of locking-bolt. Fig. 7 is a similar view of another form, in which the latch is thrown open by a spring so soon as the spring locking-bolt is retracted. Fig. 8 is a side elevation of the form shown in Figs. 6 and 7. Fig. 9 is a front elevation of the same. Fig. 10 is a side view, partly in section, of another modification of my invention. In this form the locking device is a spring-pawl. Fig. 11 is a view similar to Fig. 9, showing the device with a swivel link or ring. Fig. 12 is an inside elevation of a blank stamped up from malleable or ductile metal, which forms the body of the hook represented in front elevation in Fig. 13. This form of my invention is especially adapted for watch-chains, personal wear, and the finer class of work for which snap-hooks are used. Fig. 14 is a side elevation of another modification, representing the locking-latch secured to the side of the device.

Referring, first, to Figs. 1 to 5, inclusive, which I regard as the best form of my invention, because the latch is automatically opened by the retraction of the locking-bolt and automatically closed and locked by releasing the same, A is the body of the hook, which is formed of a hooked portion, $a^2$, and a base, $a^3$, joining the shank $a^4$, which terminates in a loop, $a$, made of proper shape to receive a strap, chain, or the swivel-pin of a ring, as desired. The piece A is centrally slotted at the junction of the base and shank to receive the end of the latch B, which terminates in a cam-shaped disk, $b$, and allows the same to revolve upon the pin $b'$, which unites the parts A and B together. The head A has also a perforation in the base, extending from the slot toward the curved or hooked end to receive the bolt C and its actuating-spring D. The bolt C has a spur, $c$, upon its inner side, which projects into a curved notch in the edge of the cam-piece $b$, for the purpose of opening the latch when the bolt is retracted, as seen in Fig. 2, and closing and locking the latch when the bolt is released and forced forward by its spring, as seen in Figs. 1 and 3. The bolt C has also a pin, $c'$, upon the opposite side from the spur $c$, which projects through a slot in the edge of piece A, by means of which the bolt C is retracted to compress the spring D and open the latch. The pin $c'$ may be provided with a knob, as seen in Figs. 1, 2, and 5, or left plain, as seen in Fig. 3. The bolt bears against the slotted wall $a'$ of piece A when the bolt is in the position shown in Figs. 1 and 3. The extreme end of the bolt C comes between the point $b^2$ of cam $b$ and wall $a'$ of hook-piece, and prevents the latch B from turning until the bolt is withdrawn.

If the device is made of cast metal, the openings for the reception of the cam $b$, the spring and bolt, and the slot in which the pin $c'$ plays are cored out, and the parts are united by first placing the spring D in place, after which the bolt is inserted through the slot or space for the reception of the cam $b$. Then the latch is placed in position and the pivot-pin $b'$ inserted and riveted. If the pin $c'$ is provided with a knob or protuberance, as seen in Figs.

1, 2, and 5, the slot in wall $a'$ should extend down to loop $a$. The knob is passed through the loop to the outside of wall $a'$, when it is passed into place, and the latch $b$ inserted and secured by its pivot-pin, as before described. The cam $b$ has one of its points cut off by a right line, which bears against the shaft of the bolt C. This in connection with the spur $c$, which bears against the point $b^2$, prevents the bolt from dropping down into the loop of hook A. The straight portion of the cam also stops the inward movement of the latch and insures a close joint between the end of the latch and the hooked end of the head A.

For small work—such as watch-chains and articles for personal wear—it is often desirable that the hook be made as small as possible consistent with strength. For this purpose I have shown some modifications of my invention in Figs. 6 to 14, inclusive. These will now be described.

The form of the hooked part A is substantially the same in all the views shown, as is also the form of latch B, the only variations being in the shape of the cam $b$ and the locking device which holds the latch closed.

In Figs. 6 to 13, inclusive, the part of the latch which enters the head A is a circular disk with a notch in its periphery to receive the spring-actuated device. This locking device in Figs. 6, 7, 8, 9, 11, 12, and 13 is the bolt C and spring D; but the bolt has the spur $c$ removed, and instead of the pin $c'$ projecting through the edge of the piece A it projects through a slot in the side; or the bolt may have two such pins projecting through opposite sides of the bolt through slots in each side of the piece A. The hole for the reception of the bolt and spring in these forms may be either cored or drilled out when the head A is cast.

In Fig. 10 I have shown a spring-pawl secured in a groove made in the edge of the hook-piece A. The locking-head of the pawl projects through a perforation in the edge of piece A to engage the notch in disk $b$. The extreme end of the pawl projects a short distance beyond the locking-head, to furnish a hold to withdraw the pawl from the notch.

In Fig. 14 a spring is arranged upon the side of piece A, which carries a pin at its free end. This pin passes through a perforation in the side of piece A, and into a perforation or notch in the disk $b$, to lock the latch in its closed position.

The latch is released by withdrawing the pin. In either of the forms represented in Sheet 2 the latch may be provided with a spring, $e$, as shown in Fig. 7, to automatically throw the latch open so soon as the lock is withdrawn from the notch in the hinged portion of the latch. The latch will of course be automatically locked so soon as closed by the spring-actuated bolt or pawl.

Figure 13:
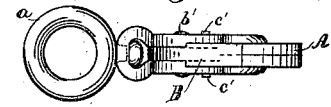

The blank shown in Fig. 12 is punched out and stamped up to the form shown by suitably-formed dies, after which the swivel link or ring is secured in place and the blank doubled over, as seen in Fig. 13, inclosing the locking-bolt and spring. The hooked end is secured by brazing, soldering, or other suitable means. The latch is then secured in place by its pivot-pin, thus completing the hook.

What I claim as new, and desire to secure by Letters Patent, is—

1. A snap-hook embodying in its construction an engaging-hook, an outwardly-opening spring-actuated latch pivoted thereto, and a spring-actuated bolt or pawl seated in the base of the hook, the said latch having its pivoted or hinged end cam-shaped or notched to receive said bolt or pawl when in its closed position, substantially as specified.

2. In a snap-hook, the combination, substantially as specified, of the hook, the outwardly-opening spring-actuated latch pivoted thereto, the bolt seated in a recess in the base of the hook, the spring to force the bolt in engagement with a notch in the latch, and the pin or knob secured to the bolt and projecting to the exterior of the hook.

3. The combination, substantially as specified, of the hook part A, recessed as shown, and the latch B, having notched and cam-shaped end $b$ $b^2$, with bolt C, having spur $c$ and pin $c'$, and the spring D, whereby the latch is automatically opened by retracting the bolt, and automatically closed and locked in its closed position by the action of the spring when the bolt is released.

4. The blank, Fig. 12, stamped up to the form shown and adapted to form the hook A when doubled to bring the hooked ends one upon the other.

GEORGE D. SPIELMAN.

Witnesses:
GEO. J. MURRAY,
T. A. BRÜHL.